Patented Dec. 12, 1922.

1,438,735

UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

RUBBER COMPOSITION.

No Drawing.  Application filed October 12, 1920.  Serial No. 416,520.

*To all whom it may concern:*

Be it known that I, ROBERT R. WILLIAMS, a citizen of the United States, residing at Roselle, in the county of Union and State of New Jersey, have invented certain new and useful Improvements in Rubber Compositions, of which the following is a full, clear, concise, and exact description.

This invention relates to the art of producing rubber compositions and particularly to the production of such articles when a filler is used.

In the manufacture of rubber articles or composition it is a common practice to mix with the rubber a filling material in order to give to the composition the desired mechanical properties such as toughness, firmness, non-adhesiveness and like. This filling material may be present in varying amounts depending on the compositions desired and most frequently consists of an inorganic substance in a finely divided state. Another important effect of the addition of such fillers is to cheapen the composition. Such fillers are often used in large amounts, commonly making up 50 to 80% of the total material in most of the important articles commonly classed as rubber. Such incorporation of fillers is always attended by diminution of distensibility and if carried beyond a certain point by decrease of mechanical strength; and in the case of electrical insulation by a diminished dielectric strength and moisture resistance. Above certain limits the weakening of the articles in these particulars, is directly proportional to the additional amounts of filler used. This is due to the fact that such rubber compositions consist of particles of filler more or less thoroughly cemented together by a magma of rubber. Mechanically and electrically, as well as in point of water absorption, the point of greatest weakness is not in the substance of the rubber nor of the filler, but in the joint bond or union between the two. This weakness is inherent in such compositions whether of low or high filler content, but is most serious in the latter case because the number of such joints per unit volume of material is increased.

An object of this invention is to provide a process whereby the mechanical, electrical and water resistant properties of rubber compositions may be greatly improved, of so treating the filler particles in the first instance that they become more intimately associated with the rubber and subsequently treating the composite rubber dough in such a way as to secure minimum porosity and a maximum cohesion.

It has been found that if the filler particles are coated initially with a film of rubber or other material which may subsequently be united with the rubber magma, much stronger bonding is secured between the filler particles and the rubber itself. In the process as carried out heretofore, the intermixing of the filler particles without any previous treatment, results in a mere superficial bonding due, to a large extent, to the failure of the rubber to enter the minute crevices of the filler particles. The magma of rubber being rather stiff and viscous, does not lend itself readily to such an operation.

In carrying out this process, the filler particles are treated with a solution of rubber or similar material of an adhesive nature in a suitable solvent. The adhesive material must be insoluble in water if the rubber composition is to have good water resistance properties. When rubber is employed, gasoline has been found satisfactory for use. This treatment is preferably carried out by mechanical mixing and may be supplemented by vacuum impregnation. It has also been found desirable to degasify the filler particles before this treatment in order to remove all traces of gas films which are normally present in the interstices or on the surface of the particles. After the application of the solution containing the rubber or the like, and the removal of the excess solvent by evaporation, a thin film covering remains on each filler particle. This forms a hermetic seal which will prevent any subsequent gas absorption or occlusion. By reason of the fluidity of the solution used, a complete penetration into the interstices and crevices is obtained, thus increasing adhesion.

The film covered filler particles are then introduced into the rubber magma according to the usual procedure becoming firmly bonded therewith, due to the intermixing of the magma rubber with the film seals. It is desirable to carry this operation out in vacuum in order that no air be kneaded into the compound either by solution in the rubber or as discrete bubbles. Otherwise such gases are expanded with heat during the subsequent hot vulcanization process, and tear the sealing film from the filler particles or produce other forms of porosity.

What is claimed is:

1. A filler for rubber compositions each particle of which is enclosed in an envelope of an adhesive material for binding the particle firmly to the rubber.

2. A filler for rubber composition having its individual particles initially enclosed by an envelope of rubber.

3. The step in the manufacture of rubber articles which contain a filler, which consists in enclosing each particle of the filler in an envelope of an adhesive material for binding said particle firmly to the rubber.

4. The step in the manufacture of rubber articles which contain a filler, which consists in enclosing each filler particle in rubber.

5. The step in the manufacture of rubber articles which contain a filler, which consists in exposing the filler particles to a rubber solution and evaporating the excess solution to permit the leaving of a thin film of rubber on each filler particle.

6. The step in the manufacture of rubber articles which contain a filler, which consists in subjecting said filler in a finely divided condition to a degasifying treatment, and subsequently covering the comminuted particles of said articles with an envelope of an adhesive material.

7. The step in the manufacture of rubber articles which contain a filler, which consists in subjecting said filler to a degasifying treatment, and subsequently covering said filler with an envelope of rubber.

8. The step in the manufacture of rubber articles which contains a filler, which consists in subjecting said filler to a degasifying treatment, in covering the degasified filler particles with a thin film of rubber, and mixing said filler particles with the rubber magma in vacuum.

9. The step in the manufacture of rubber articles which contain a filler, which consists in enclosing each filler particle in an envelope of adhesive material which is insoluble in water.

10. A filler for rubber compositions having its individual particles enclosed in an envelope of an adhesive material which is insoluble in water.

In witness whereof, I hereunto subscribe my name this 9th day of October A. D., 1920.

ROBERT R. WILLIAMS.